United States Patent
Numminen et al.

(10) Patent No.: US 7,933,310 B2
(45) Date of Patent: Apr. 26, 2011

(54) SYSTEM FOR A FAST FREQUENCY HOPPING RADIO

(75) Inventors: Michael Numminen, Savedalen (SE); Morgan Andersson, Romelanda (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 664 days.

(21) Appl. No.: 11/914,061

(22) PCT Filed: May 13, 2005

(86) PCT No.: PCT/SE2005/000693
§ 371 (c)(1),
(2), (4) Date: Nov. 9, 2007

(87) PCT Pub. No.: WO2006/121379
PCT Pub. Date: Nov. 16, 2006

(65) Prior Publication Data
US 2008/0198901 A1    Aug. 21, 2008

(51) Int. Cl.
*H04B 1/00* (2006.01)
(52) U.S. Cl. ........ 375/132; 375/133; 375/134; 375/135; 375/136; 375/137
(58) Field of Classification Search ........... 375/130–153
See application file for complete search history.

(56) References Cited

U.S. PATENT DOCUMENTS

| | | | |
|---|---|---|---|
| 5,235,613 A | 8/1993 | Brown et al. | |
| 5,859,664 A | 1/1999 | Dent | |
| 5,970,400 A * | 10/1999 | Dwyer | 455/254 |
| 7,440,474 B1 * | 10/2008 | Goldman et al. | 370/503 |
| 7,656,931 B2 * | 2/2010 | Smith et al. | 375/131 |
| 2002/0118024 A1 * | 8/2002 | Hill | 324/642 |

FOREIGN PATENT DOCUMENTS

| | | |
|---|---|---|
| CN | 1441563 A | 9/2003 |
| EP | 1 330 045 A1 | 7/2003 |
| JP | H07-183828 A | 7/1995 |

OTHER PUBLICATIONS

Li, Zan et al. A Novel Family of Frequency Hopping Sequences for Multi-hop Bluetooth Networks. IEEE Transactions on Consumer Electronics, vol. 49, No. 4 Nov. 2003.
Moore, Todd el al. Improved Fuzzy Frequency Hopping. IEEE 1997.

* cited by examiner

*Primary Examiner* — Curtis B Odom

(57) ABSTRACT

The invention discloses a system (100) for a fast frequency hopping radio, and comprises a transmit part (110) and a receive part (120). Each of the receive (110) and transmit (120) parts comprise a unit (115, 125) for random frequency generation, the random frequency generating unit of both parts being similar. The random frequency generator (115, 125) of each of said parts comprises a pseudo random number generator, a PRN-generator, the PRN-generator being based on a FIR-algorithm, and said PRN-generator uses a clock signal which has been generated externally to the system as input. The external clock signal which is used is suitably a clock signal from the GPS-system.

2 Claims, 3 Drawing Sheets

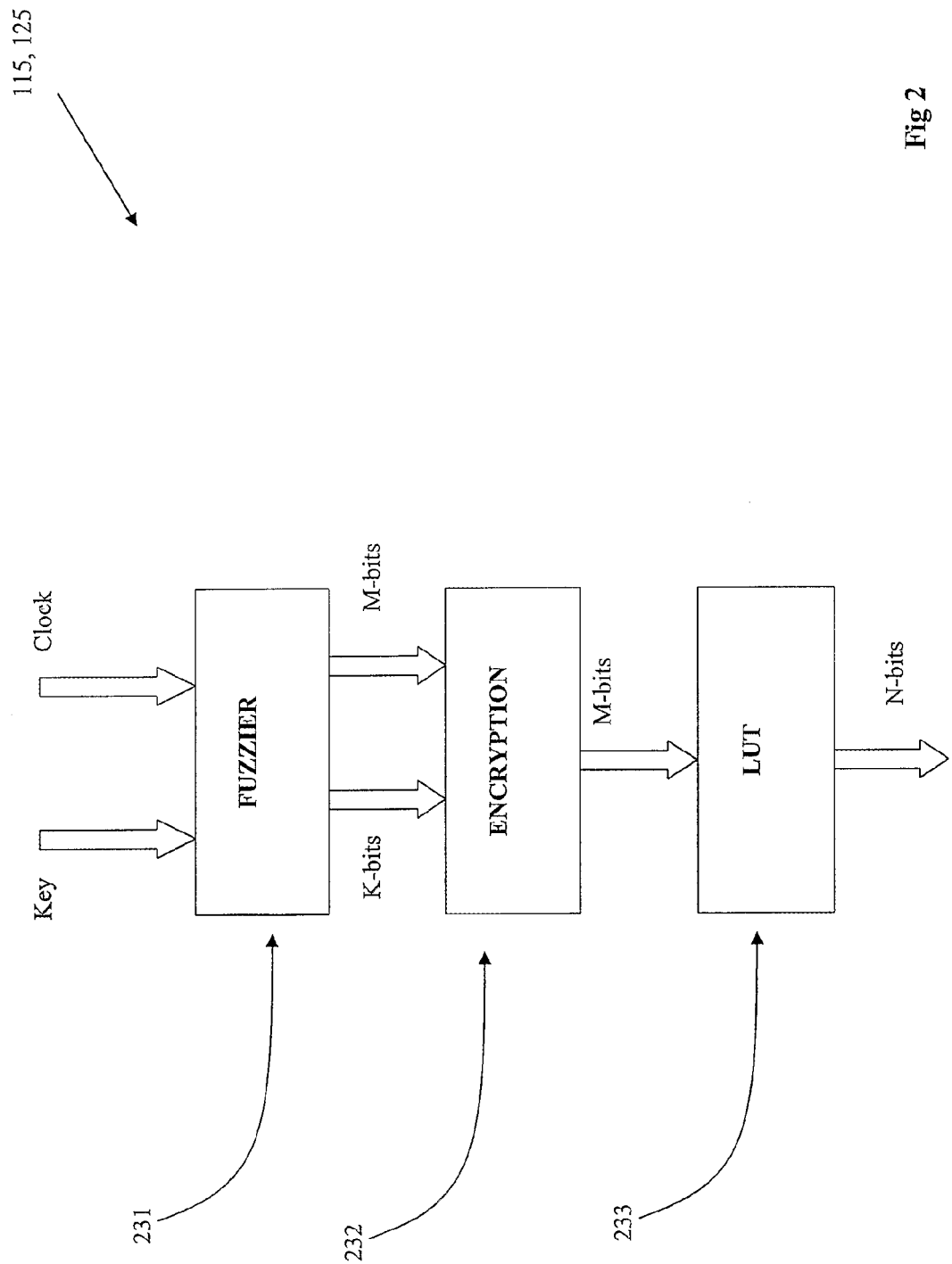

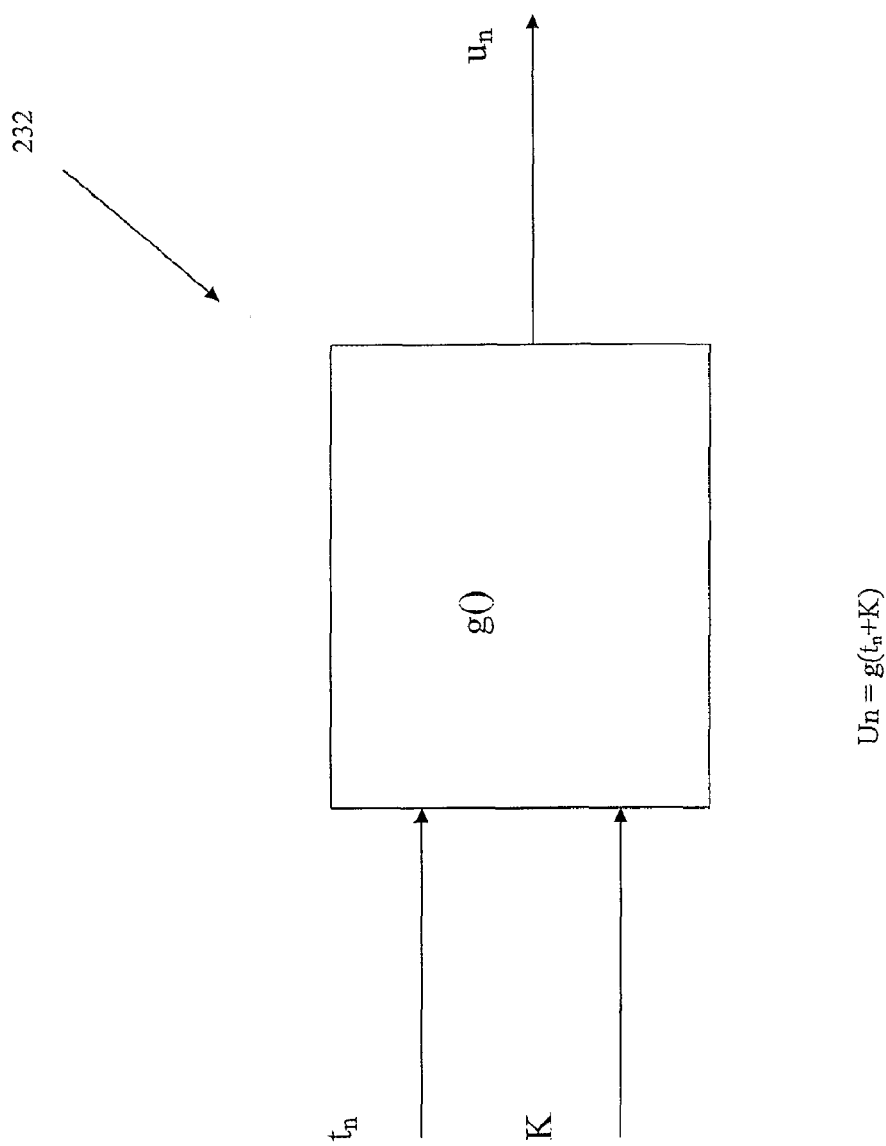

SYSTEM FOR A FAST FREQUENCY HOPPING RADIO

TECHNICAL FIELD

The present invention discloses a system for a fast frequency hopping radio, said system comprising a transmit part and a receive part. Each of the receive and transmit parts comprise a unit for random frequency generation, and the random frequency generating units of both parts are similar.

BACKGROUND ART

Within the field of radio communications, the technology known as "spread spectrum" is often employed in order to make a deterministic signal appear stochastic. Such a signal will be similar to white noise, thus making it very difficult to understand an intercepted signal.

One known method for achieving "spread spectrum" is Fast Frequency Hopping, abbreviated as FFH. The frequency employed at any given moment in such a system is often determined by a random frequency generator, which is driven by a synchronization signal known both to the receiver and the transmitter, in order to enable the receiver to "follow" the frequencies used by the transmitter.

A feature common to many FFH-systems of the kind described above is that each "state", or, in this case, frequency, has a strong dependency on the frequency or frequencies used previously. If the transmitter and receiver for some reason "lose" their synchronization, the transmitter and receiver will be out of phase, meaning that the receiver will not be able to "hear" the transmitter.

DISCLOSURE OF THE INVENTION

There is thus a need for a method or device for use with Fast Frequency Hopping (FFH) that would offer a more reliable way for a transmitter and receiver to "keep up" with the frequency changes. Preferably, such a method or device should also offer a more reliable way of generating the frequencies than previously known methods and devices.

This need is addressed by the present invention by disclosing a system for a fast frequency hopping radio, the system comprising a transmit part and a receive part. Each of the receive and transmit parts comprise a unit for random frequency generation, and the random frequency generating unit of both parts are similar. In the system of the invention, the random frequency generator of each of said transmit and receive parts comprises a pseudo random number generator, a PRN-generator, which is based on a FIR-algorithm, and said PRN-generator uses a clock signal which has been generated externally to the system as input.

BRIEF DESCRIPTION OF THE DRAWINGS

The invention will be described in more detail in the following, with reference to the appended drawings, in which FIG. 2 shows the principle of PRN:s with a common external input, and FIG. 3 shows a detailed block diagram of a PRN.

EMBODIMENTS

Figure 1:
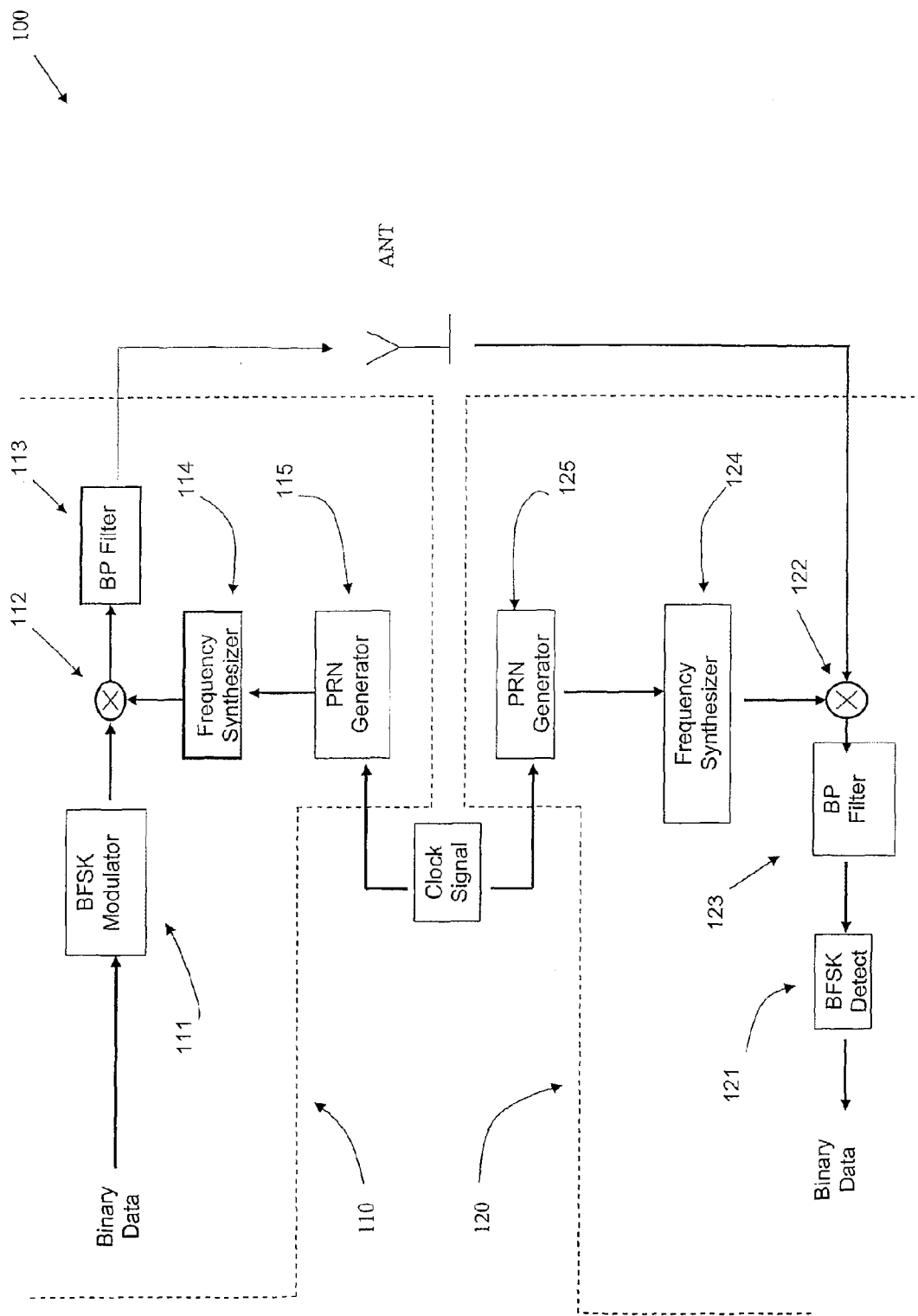
FIG. 1 shows block diagrams of a frequency hopping receiver and a transmitter.

In FIG. 1, a system 100 according to the invention is shown. As indicated by dotted lines, the system comprises a transmit part 110 and a receive part 120. A unit in the system can comprise a send and a receive part as separate physical components, or integrated as one. In a preferred embodiment, the two parts are integrated as one. However, the send and receive parts shown in FIG. 1 are not those that would be integrated in one physical unit. The transmit and receive parts shown in FIG. 1 are two parts which would communicate with each other, and would thus be the transmit part of a first radio and the receive part of a second radio.

As shown in FIG. 1, the transmit part comprises a BFSK-modulator 111, a mixer 112, and a band pass filter 113. A stream of binary data which is to be transmitted is used as input to the modulator 111, and the output of the modulator is used as one of the inputs to the mixer 112. The other input to the mixer 112 is from a frequency synthesizer unit 114 in the transmit part 110. It is the input from the frequency synthesizer 114 to the mixer 112 which determines the transmit frequency of the signal.

As also indicated in FIG. 1, the frequency synthesizer 114 of the transmit part in turn gets its input from a pseudo random generator (PRN generator) unit 115 in the transmit part 110. The design of the PRN-generator will be elaborated upon more later in this text.

The signal which is transmitted by the transmit part of the system is symbolically shown as being received in the receive part in FIG. 1. The received signal is used as one of the inputs to a mixer unit 122 in the receive part 120, and the output of the mixer 122 is fed through a band pass filter 123. The other input to the mixer 122 is the output from a frequency synthesizer 124 in the transmit part 120.

As also indicated in FIG. 1, the frequency synthesizer 124 of the transmit part in turn gets its input from a pseudo random generator (PRN generator) unit 125 in the transmit part 120. The design of the PRN-generator 125 will also be elaborated upon more later in this text.

The output from the band pass filter 123 is used as input to a BFSK-detector 121 in the receive part 120, and the output of the BFSK-detector will be a reproduction of the binary data which was used as input to the BFSK-modulator in the transmit side.

Turning now to FIG. 2, this figure illustrates the design of the PRN-generator in more detail. As stated above, the PRN-generators which are used in the transmit part and the receive part share the same design, i.e. that shown in FIG. 2.

The PRN-generator 115, 125 shown in FIG. 2 comprises three major components: a "fuzzier" unit 231, an encryption unit 232 and a look-up table 233.

The "fuzzier" component 231 is not absolutely necessary, but uses a key which is known to the receive and/or the transmit part and an input signal from a clock signal which has been generated externally to the system as its input. The fact that the key is known in the respective part, and that the other input to the fuzzier unit is generated externally to the system means that there is a negligible risk of the system losing its "sync".

The fuzzier unit 231 uses the key, which is an integer, and the externally generated input signal in order to "fuzz" the signals. As an example, if the two signals in are denoted as a and b, respectively, where $a=(a_1, a_2, a_3 \ldots a_N)$ and $b=(b_1, b_2, b_3 \ldots b_M)$, and the transfer function of the unit 231 is denoted as fuzz ( ), then $\text{fuzz}(a, b)=(a_1, b_1, a_2, b_2 \ldots a_N, b_N, b_M)$ if $M>N$. If $N>M$ then $\text{fuzz}(a, b)=(a_1, b_1, a_2, b_2, \ldots a_M, b_M, a_N)$.

The encryption unit 232 is shown in more detail in FIG. 3. As indicated in FIG. 3, the encryption unit 232 uses two input signals, a key K, and a time-variant signal $t_n$, and has a transfer function g. Thus, the encrypted output $U_n$ will be $U_n=g(t_n+K)$.

If the fuzzier unit 231 is employed, the inputs to the encryption unit 232 will be the outputs from the fuzzier unit 231.

As also indicated in FIG. 3, the transfer function g of the encryption unit is not dependent on the previously produced random number $U_{n\,1\,1}$, since there is no feed connection from the output of the unit to either of its inputs. If seen as an electrical circuit, the encryption unit can thus be likened to a FIR-filter, (Finite Impulse Response), as opposed to an IIR-filter, (Infinite Impulse Response), which has a backwards feed from its output to its input. Another term which might be used for the encryption unit of the system 200 is that it is based on a true feed forward algorithm without feedback loops.

One algorithm which is suitable for use in the encryption unit of the invention is the so called Tiny Encryption Algorithm, TEA, or the version of it known as XTEA, the extended TEA.

The output from the encryption unit is thus one data word of M bits, M being an integer determined by frequencies which it is desired to cancel in the Frequency Hopping Radio. The data word is used as input to a look up table, LUT, 233. The LUT has a list of frequencies stored, each of which corresponds to a different value of the data word.

Thus, the output from the LUT 233 is used as input to the Frequency Synthesizers 114, 124, of the transmit and receive parts, in order to generate the correct frequency.

Turning now to FIG. 3, a view of the principle of the PRN-generators 114, 124, is shown. As can be seen, the external signal which is used as their input is one which can be accessed by both PRN-generators 114, 124 at the same time. An example of a suitable such signal is the time signal comprised in signals from the GPS-system, although many other sources of signals can be envisioned. Examples of other such external clock signals which can be mentioned are clock signals comprised in nationwide television broadcasts, in radio signals for controlling radio controlled clocks and watches, and other satellite navigation systems than the GPS-system.

As an alternative to the look up table shown in FIG. 2 as comprised in the PRN- generator, the encryption unit can be connected directly to the frequency generator, which would then have a function for generating a frequency using an input data word from the encryption unit.

The invention claimed is:

1. A system for a fast frequency hopping radio, the system comprising a transmit part and a receive part, each of the receive and transmit parts comprising a unit for random frequency generation, the random frequency generating unit of both parts being similar, wherein the random frequency generator of each of said parts comprises a pseudo random number generator (PRN-generator), said PRN-generator being based on a FIR-algorithm, said PRN-generator uses a clock signal which has been generated externally to the system as input, and said PRN-generator further comprises
 a fuzzier unit,
 an encryption unit, which in response to receiving two input signals, a key and a time-variant signal, said encryption unit outputs a data word, and
 a look-up table including a list of frequencies, wherein each frequency on said list of frequencies corresponds different values of said data word.

2. The system of claim 1, in which the external clock signal is a clock signal from the GPS-system.

* * * * *

UNITED STATES PATENT AND TRADEMARK OFFICE
CERTIFICATE OF CORRECTION

PATENT NO.       : 7,933,310 B2   Page 1 of 1
APPLICATION NO.  : 11/914061
DATED            : April 26, 2011
INVENTOR(S)      : Numminen et al.

It is certified that error appears in the above-identified patent and that said Letters Patent is hereby corrected as shown below:

On the Title Page, in item (75), under "Inventors", in Column 1, Line 1, delete "Savedalen" and insert -- Sävedalen --, therefor.

On the Title Page, in item (56), under "OTHER PUBLICATIONS", in Column 2, Line 4, delete "el" and insert -- et --, therefor.

In Column 3, Line 5, delete "$U_{n\ 1\ 1}$," and insert -- $U_{n-1}$, --, therefor.

Signed and Sealed this
Fourteenth Day of February, 2012

David J. Kappos
*Director of the United States Patent and Trademark Office*